US012502926B2

(12) United States Patent
Kornburger et al.

(10) Patent No.: US 12,502,926 B2
(45) Date of Patent: Dec. 23, 2025

(54) THERMAL CONTROL SYSTEM FOR VARIABLE POSITION SEATING ARRANGEMENT

(71) Applicant: GM Global Technology Operations LLC, Detroit, MI (US)

(72) Inventors: Steven A. Kornburger, Oxford, MI (US); David M. Aller, Grosse Pointe Farms, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 410 days.

(21) Appl. No.: 18/356,543

(22) Filed: Jul. 21, 2023

(65) Prior Publication Data

US 2025/0026170 A1  Jan. 23, 2025

(51) Int. Cl.
*B60H 1/00* (2006.01)
*B60N 2/015* (2006.01)
*B60N 2/04* (2006.01)
*B60N 2/56* (2006.01)
*B62D 25/20* (2006.01)

(52) U.S. Cl.
CPC ..... *B60H 1/00285* (2013.01); *B60H 1/00842* (2013.01); *B60N 2/01575* (2013.01); *B60N 2/01591* (2013.01); *B60N 2/04* (2013.01); *B60N 2/5607* (2013.01); *B62D 25/20* (2013.01)

(58) Field of Classification Search
CPC ........... B60H 1/00285; B60H 1/00842; B60N 2/01575; B60N 2/01591; B60N 2/04; B60N 2/5607; B62D 25/20
USPC ...................................................... 454/120
See application file for complete search history.

(56) References Cited

U.S. PATENT DOCUMENTS

| 3,682,431 A | * | 8/1972 | Vivian | B60N 2/509 |
| | | | | 248/631 |
| 4,895,338 A | * | 1/1990 | Froutzis | F16B 2/10 |
| | | | | 248/74.1 |
| 5,385,382 A | * | 1/1995 | Single, II | A47C 7/74 |
| | | | | 297/180.13 |

(Continued)

FOREIGN PATENT DOCUMENTS

| DE | 102015210624 A1 | 12/2016 |
| DE | 102019204958 A1 | 10/2020 |

(Continued)

OTHER PUBLICATIONS

DE Office Action for Appln No. 10 2023 128 152.6 dated Jul. 17, 2024, 7 pages.

*Primary Examiner* — Avinash A Savani
*Assistant Examiner* — Ryan L Faulkner
(74) *Attorney, Agent, or Firm* — CANTOR COLBURN LLP

(57) ABSTRACT

A vehicle system includes a floor having a first side and a second side that is opposite the first side. The floor includes a plurality of openings. A seat is moveably supported on the floor. The seat includes a frame having a support member. An anchor system is mounted to the support member. The anchor system includes a selectively deployable anchor that secures the seat to the floor through one of the plurality of openings. A thermal control system is disposed in the seat. The thermal control system includes a duct having and inlet and an outlet. The inlet is selectively connectable to a vehicle based fluid supply system.

20 Claims, 5 Drawing Sheets

(56) References Cited

U.S. PATENT DOCUMENTS

| | | | | |
|---|---|---|---|---|
| 5,466,111 | A * | 11/1995 | Meyer | B60N 2/245 |
| | | | | 414/800 |
| 6,196,610 | B1 * | 3/2001 | Pesta | B60N 2/01591 |
| | | | | 296/65.09 |
| 6,347,834 | B1 * | 2/2002 | Couasnon | B60N 2/36 |
| | | | | 296/65.09 |
| 6,478,369 | B1 * | 11/2002 | Aoki | B60N 2/5635 |
| | | | | 297/344.13 |
| 12,083,854 | B2 | 9/2024 | Michael et al. | |
| 2006/0028044 | A1 * | 2/2006 | Oishi | B60N 2/3075 |
| | | | | 296/65.03 |
| 2009/0302665 | A1 * | 12/2009 | Dowty | B61D 33/0057 |
| | | | | 296/1.03 |
| 2020/0155386 | A1 * | 5/2020 | Kumar | A61G 3/0808 |

FOREIGN PATENT DOCUMENTS

| | | |
|---|---|---|
| DE | 102020208995 A1 | 1/2021 |
| DE | 102022122405 A1 | 3/2024 |

* cited by examiner

THERMAL CONTROL SYSTEM FOR VARIABLE POSITION SEATING ARRANGEMENT

INTRODUCTION

The subject disclosure relates to the art of thermal control systems for vehicle seats and, more particularly, to a thermal control system for a seat associated with a variable position seating arrangement.

Vehicles include a number of seats that accommodate passengers including a driver. In many cases, the seats are arranged in a front row and a second row behind the front row. In some cases a third row is disposed behind the second row. Seats are typically fore-to-aft adjustable in order to accommodate different sized passengers. That is, the seats are attached to, and may move forward and rearward relative to, first and second support rails. While the seats may be adjustable and/or removed from the vehicle, the physical location of the seats is fixed in the vehicle.

Seat tracks are fixedly secured to floor surfaces and are not easily moved. As such, seating arrangements in the vehicle are essentially unchangeable without extensive structural changes made by professionals in a specialty repair or modification facility. In addition to changing seat rail locations, ducting for seat based environmental systems, if provided, must also be moved. Moving seat rails and ducting is a costly and labor intensive effort that is not available to all vehicle owners. Accordingly, it is desirable to provide a system that reduces the cost and complexity of rearranging seats while maintaining fluidic connections for seat-based environmental systems.

SUMMARY

A vehicle system, in accordance with a non-limiting example, includes a floor having a first side and a second side that is opposite the first side. The floor includes a plurality of openings. A seat is moveably supported on the floor. The seat includes a frame having a support member. An anchor system is mounted to the support member. The anchor system includes a selectively deployable anchor that secures the seat to the floor through one of the plurality of openings. A thermal control system is disposed in the seat. The thermal control system includes a duct having and inlet and an outlet. The inlet is selectively connectable to a vehicle based fluid supply system.

In addition to one or more of the features described herein a supply of conditioned fluid flows across the second side of the floor, the supply of conditioned fluid passes through select ones of the plurality of openings into the inlet.

In addition to one or more of the features described herein the seat includes a seat back and a seat base, the duct includes a first duct including a first inlet arranged at the support member and a first outlet arranged in the seat back, and a second duct including a second inlet arranged at the support member and a second outlet arranged in the seat base.

In addition to one or more of the features described herein a valve element arranged in each of the plurality of openings, the valve element being selectively opened when connected to the inlet.

In addition to one or more of the features described herein the valve element includes a flexible nozzle portion including a first section and a second section, the flexible nozzle portion being selectively expanded by the inlet.

In addition to one or more of the features described herein a conditioned fluid manifold connected to the inlet, the conditioned fluid manifold including a plurality of inlet members that selectively pass through select ones of the plurality of openings.

In addition to one or more of the features described herein the anchor system includes a solenoid including the selectively deployable anchor, the solenoid being energized to extend the selectively deployable anchor through the one of the plurality of openings.

In addition to one or more of the features described herein the selectively deployable anchor includes a selectively deployable locking portion that selectively prevents withdrawal of the selectively deployable anchor from the one of the plurality of openings.

In addition to one or more of the features described herein the inlet projects rearwardly of the seat, the inlet being selectively connectable to a wall mounted conditioned fluid supply port.

In addition to one or more of the features described herein a plurality of wheels connected to the frame.

A vehicle, in accordance with a non-limiting example, includes a body defining a passenger compartment having a floor including a first side and a second side that is opposite the first side, and a plurality of openings formed in the floor. A seat is moveably supported on the first side of the floor. The seat includes a frame having a support member. An anchor system is mounted to the support member. The anchor system includes a selectively deployable anchor that secures the seat to the floor through one of the plurality of openings. A thermal control system is disposed in the seat. The thermal control system includes a duct having and inlet and an outlet. The inlet is selectively connectable to a vehicle based fluid supply system.

In addition to one or more of the features described herein a supply of conditioned fluid flowing across the second side of the floor, the supply of conditioned fluid passing through select ones of the plurality of openings into the inlet.

In addition to one or more of the features described herein the seat includes a seat back and a seat base, the duct including a first duct including a first inlet arranged at the support member and a first outlet arranged in the seat back, and a second duct including a second inlet arranged at the support member and a second outlet arranged in the seat base.

In addition to one or more of the features described herein a valve element is arranged in each of the plurality of openings. The valve element is selectively opened when connected to the inlet.

In addition to one or more of the features described herein the valve element includes a flexible nozzle portion including a first section and a second section, the flexible nozzle portion being selectively expanded by the inlet.

In addition to one or more of the features described herein a conditioned fluid manifold connected to the inlet, the conditioned fluid manifold including a plurality of inlet members that selectively pass through select ones of the plurality of openings.

In addition to one or more of the features described herein the anchor system includes a solenoid including the selectively deployable anchor, the solenoid being energized to extend the selectively deployable anchor through the one of the plurality of openings.

In addition to one or more of the features described herein the selectively deployable anchor includes a selectively deployable locking portion that selectively prevents withdrawal of the selectively deployable anchor from the one of the plurality of openings.

In addition to one or more of the features described herein the passenger compartment includes a side wall including a conditioned fluid supply port, the inlet projecting rearwardly of the seat, the inlet being selectively connectable with the conditioned fluid supply port.

In addition to one or more of the features described herein a plurality of wheels connected to the frame.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
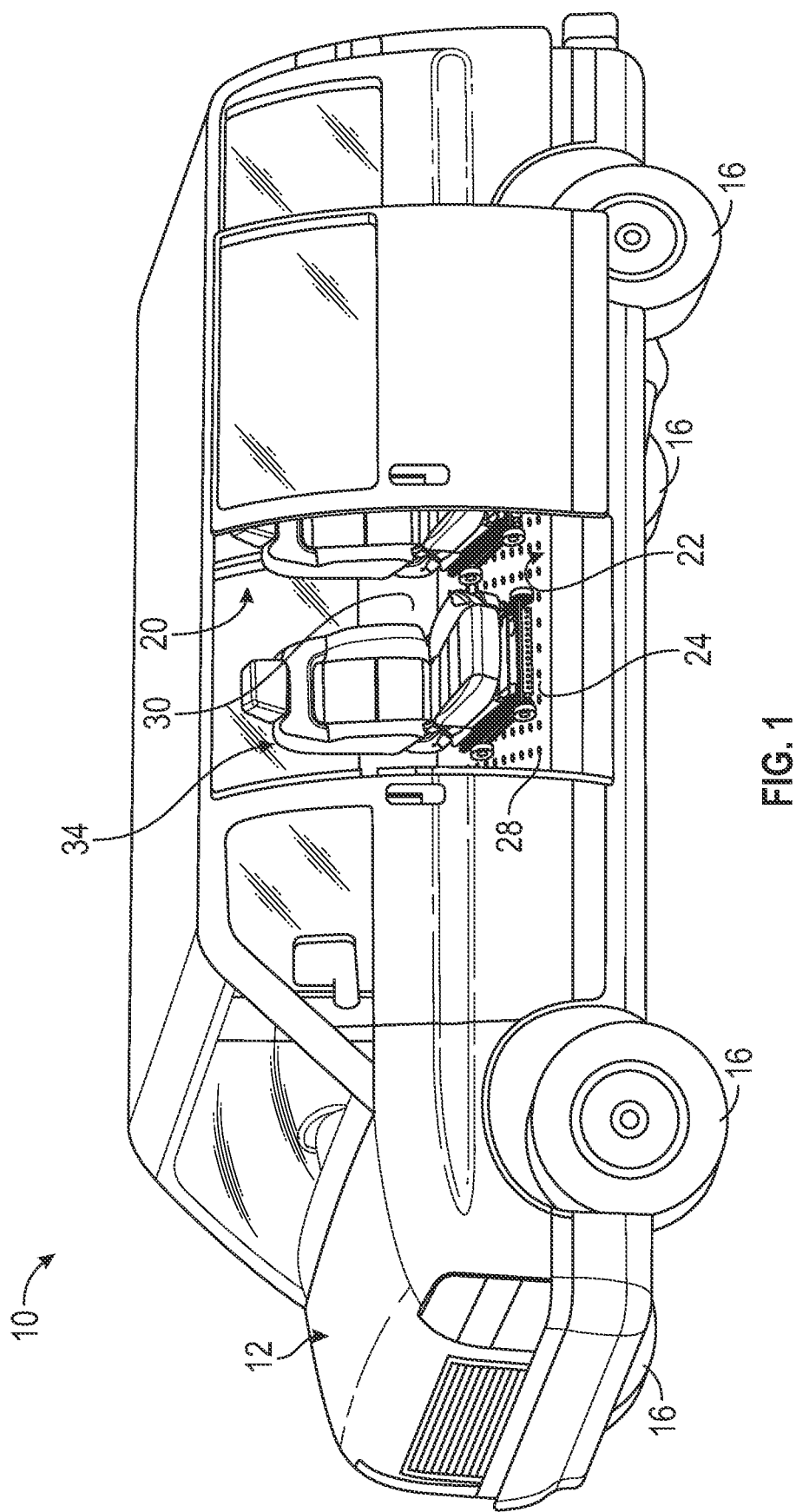
FIG. 1 is a left side perspective view of a vehicle including variable position seats having a thermal control system, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with a non-limiting example, is indicated generally at 10 in FIG. 1. Vehicle 10 includes a body 12 supported on a plurality of wheels 16. Body 12 defines, in part, a passenger compartment 20 having a floor 22 including a first surface 24 and a second surface 26, FIG. 2, that is an opposing side of first surface 24. A plurality of openings, one of which is indicated at 28 extend through floor 22. Passenger compartment 20 also includes a plurality of walls, one of which is indicated at 30.

In a non-limiting example, floor 22 supports a number of seats, one of which is indicated at 34, that form a variable position seating arrangement. That is, seats 34 may be easily shifted around passenger compartment 20 and positioned anywhere on floor 22 where there are openings 28. As will be detailed herein, openings 28 define anchor points for seat 34. Openings 28 may also define conditioned fluid supply ports that deliver conditioned fluid into each seat 34 as will also be detailed herein.

Figure 2:
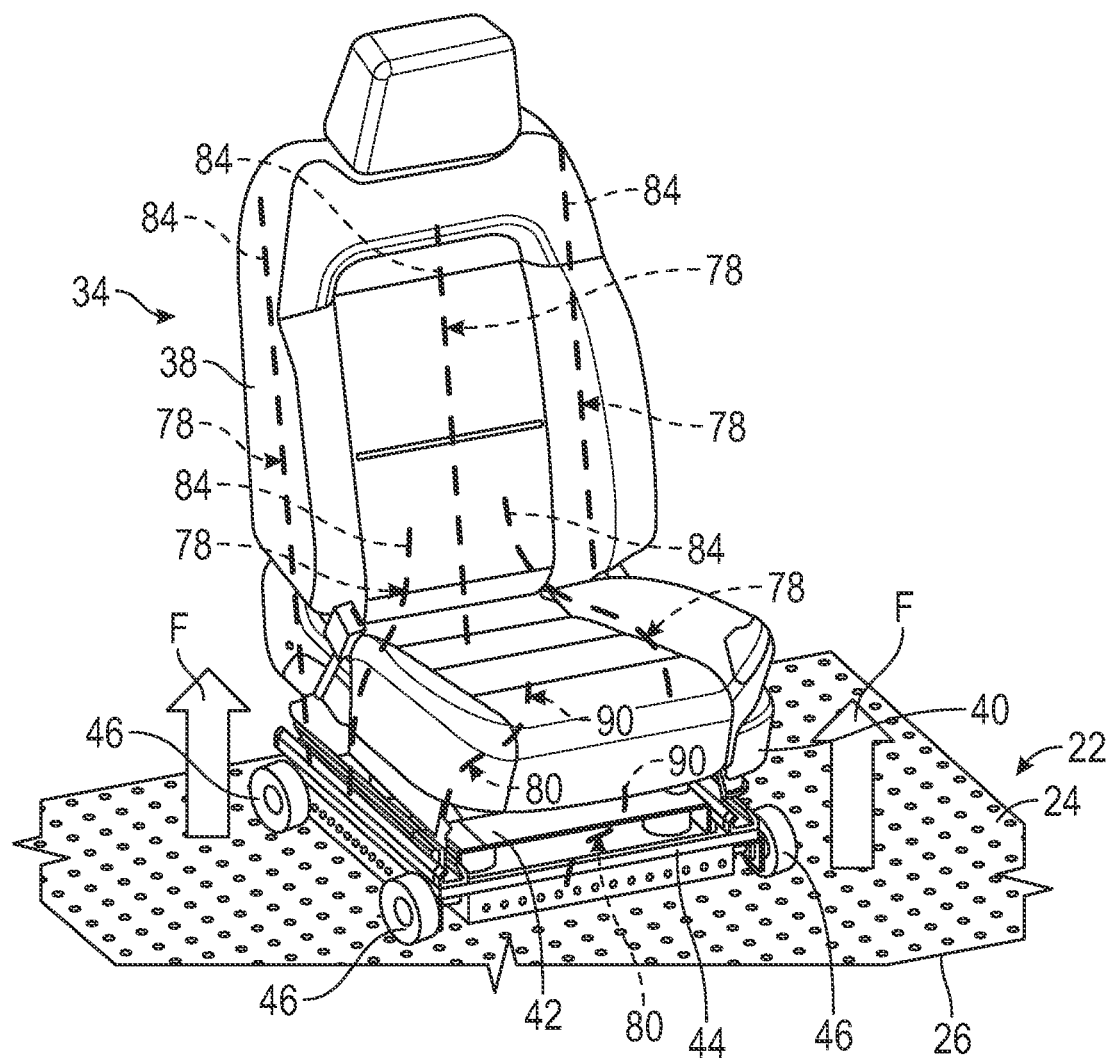
FIG. 2 is a perspective view of a variable position seat having a thermal control system, in accordance with a non-limiting example.
Figure 3:
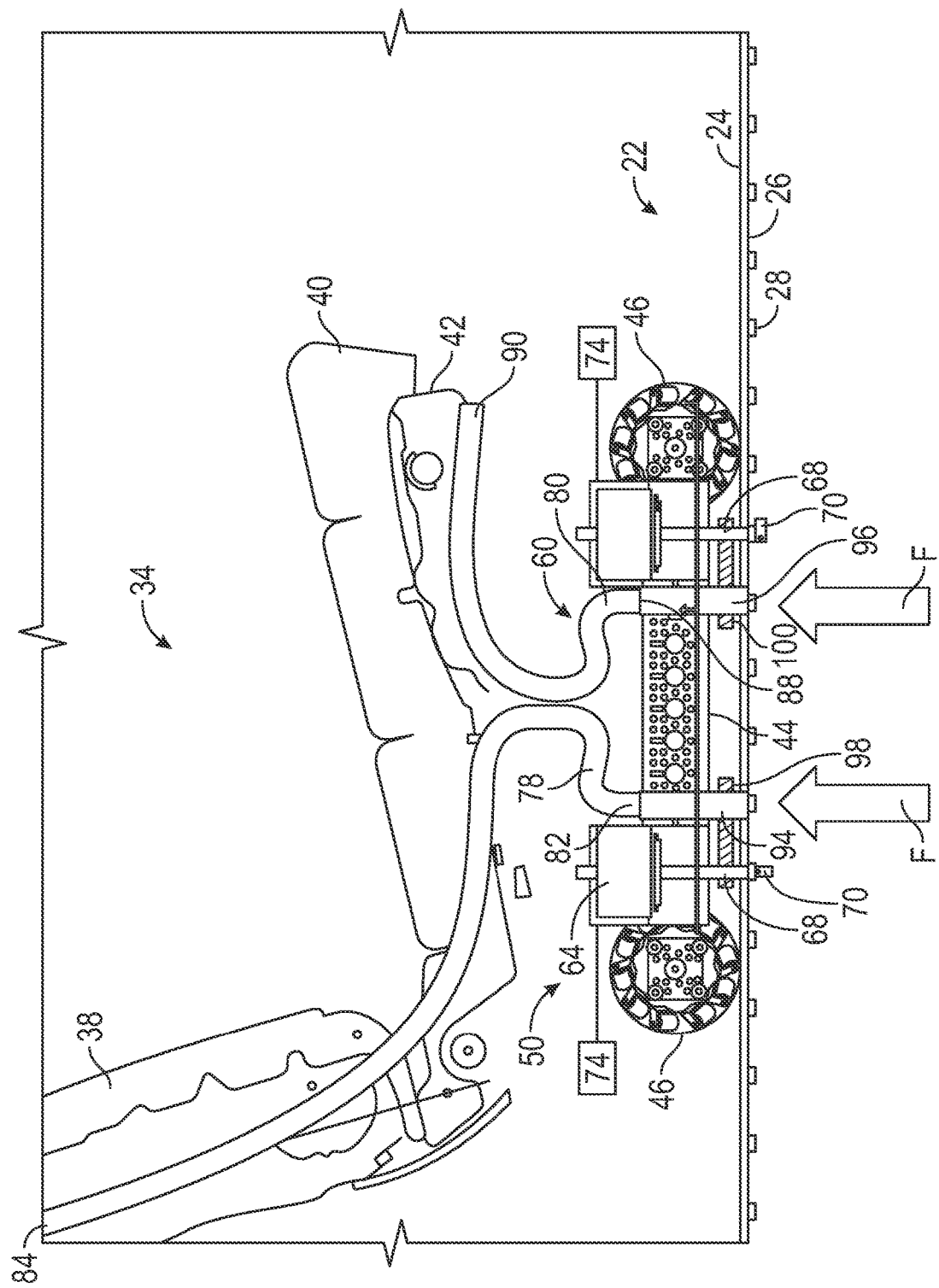
FIG. 3 is a cross-sectional side view of the variable position seat of FIG. 2 connected to floor mounted conditioned fluid supply ports, in accordance with a non-limiting example.

Referring to FIGS. 2 and 3, seat 34 includes a seat back 38 and a seat base 40 having a frame 42. Frame 42 includes a support member 44 which, in addition to providing a base for a plurality of wheels 46, also supports an anchor system 50 and a thermal control system 60. As will be detailed more fully herein, anchor system 50 is selectively operated to release and/or secure seat 34 to floor 22. In a non-limiting example, anchor system 50 includes a plurality of solenoids, one of which is indicated at 64. Each solenoid 64 includes a selectively deployable anchor 68 having a selectively deployable locking portion 70. Each solenoid 64 is coupled to a controller 74 that operates to extend and/or retract selectively deployable anchor 68 and set and/or release the selectively deployable locking portion 70.

In a non-limiting example, when desired to reposition seat 34, controller 74 signals each solenoid to release each selectively deployable locking portion 70. Once signaled, each selectively deployable locking portion 70 rotates to come into alignment with the corresponding selectively deployable anchor 68. At this point, controller 74 signals each solenoid 64 to retract each selectively deployable anchor 68 from floor 22. Seat 34 may then be moved about first surface 24 of floor 22 into a desired location. Once at the desired location, controller 74 may signal each solenoid 64 to deploy each selectively deployable anchor 68 through openings 28 in floor 22 and rotate each selectively deployable locking portion 70 to secure seat 34 in passenger compartment 20.

In addition to securing seat 34 to floor 22, the deployment and/or retraction of selectively deployable anchors 68 also establishes a fluidic connection for thermal control system 60. In a non-limiting example, seat 34 includes a first duct 78 that extends from support member 44 into seat back 38 and a second duct 80 that extends from support member 44 into seat base 40. First duct 78 includes a first inlet 82 and a first outlet 84. Second duct 80 includes a second inlet 88 and a second outlet 90. The number and arrangement of ducts may vary as may the number and location of outlets.

In a non-limiting example, a first deployable nozzle 94 is connected to first inlet 82 and a second deployable nozzle 96 is connected to second inlet 88. First deployable nozzle 94 is also connected to one of the selectively deployable anchors 68 through a first bridge 98 and second deployable nozzle 96 is connected to another selectively deployable anchor 68 through a second bridge 100. With this arrangement, activation of solenoids 64 not only extends and retracts the selectively deployable anchors 68 but also extends deployable nozzles 94 and 96 to create a fluidic connection for thermal control system 60. That is, when selectively deployable anchors 68 are extended, first deployable nozzle 94 and second deployable nozzle 96 pass into openings 28. Conditioned fluid (F) flowing under second surface 26 of floor 22 may pass into first deployable nozzle 94 and second deployable nozzle 96 and enter first duct 78 and second duct 80.

Figure 4:
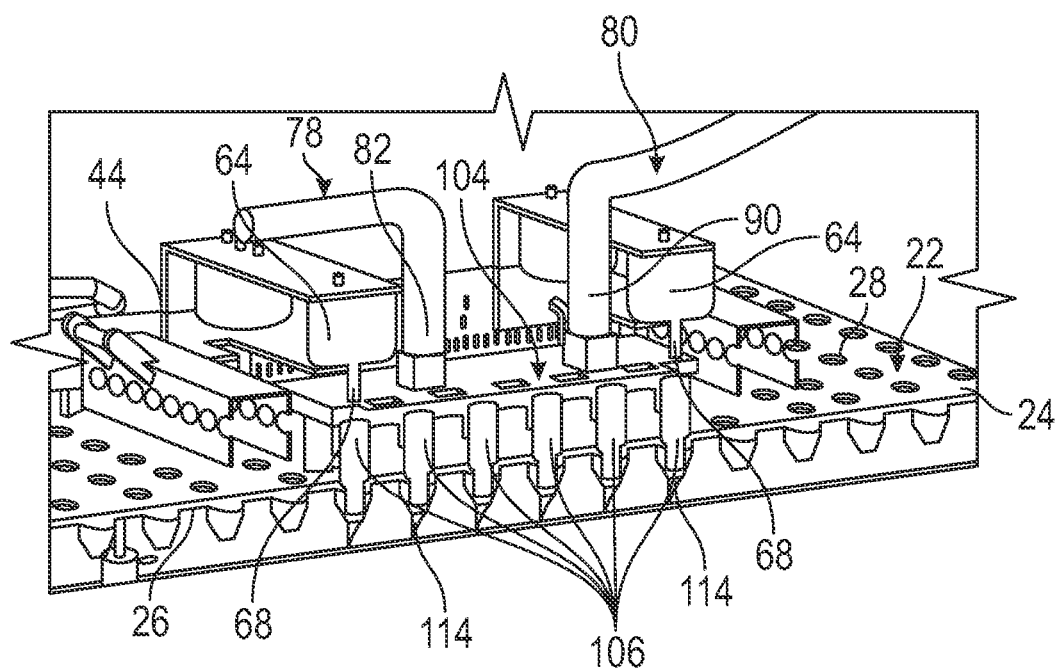
FIG. 4 is a cross-sectional view of a frame and support member of the variable position seat having a thermal control system, in accordance with another non-limiting example.

Reference will now follow to FIG. 4 in describing a conditioned fluid manifold 104 in accordance with another non-limiting example. First duct 78 and second duct 80 are connected to conditioned fluid manifold 104. With this arrangement, instead of having a single nozzle associated with each duct, conditioned fluid manifold 104 includes a plurality of deployable inlet members 106 that may be inserted and/or withdrawn, as a group, into corresponding ones of openings 28 in floor 22. The number and arrangement of inlet members 106 may vary. That is, in a manner similar to that discussed herein, conditioned fluid manifold 104 is connected to one or more of deployable anchors 68. When solenoid(s) 64 is activated to deploy anchor(s) 68, deployable inlet members 106 are inserted into openings 28 to create a fluidic connection.

Figure 5:
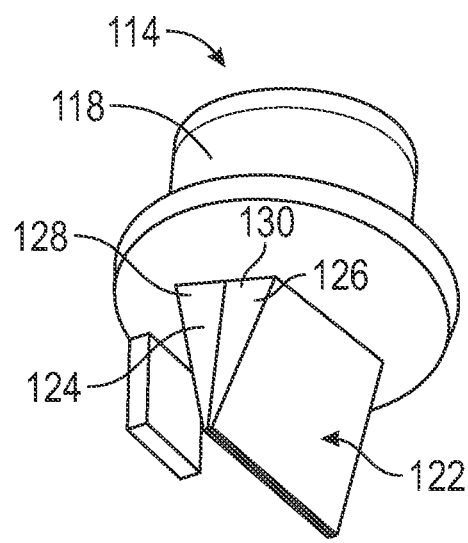
FIG. 5 is a perspective view of a valve element, insertable into one of the conditioned fluid supply ports, in a closed configuration, in accordance with a non-limiting example.
Figure 6:
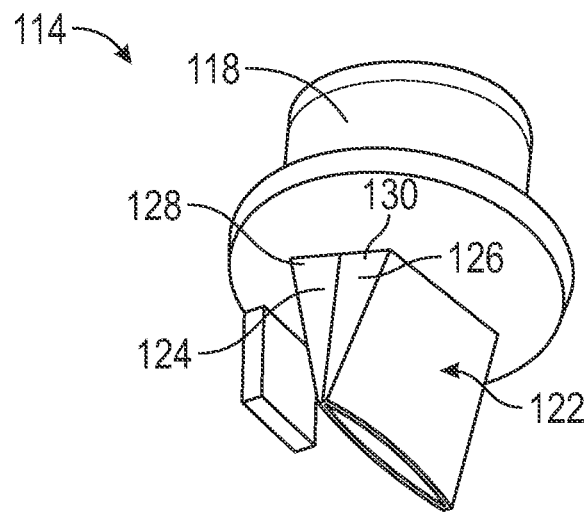
FIG. 6 is a perspective view of a valve element of FIG. 5 in an open configuration, in accordance with a non-limiting example.

In accordance with a non-limiting example, in order to prevent an uncontrolled release of conditioned fluid through floor 22, each opening 28 is provided with a valve element 114 such as shown in FIGS. 5 and 6. Valve element 114 includes a base 118 that is installed in opening 28 and a flexible nozzle portion 122 that selectively opens to allow conditioned fluid to pass through floor 22. The conditioned fluid may pass directly into a duct or into conditioned fluid manifold 104. Flexible nozzle portion 122 includes a first section 124 and a second section 126 that connect to base 118 through a first flexible hinge 128 and a second flexible hinge 130. First section 124 and second section 126 come together to form a barrier to conditioned fluid, FIG. 5, and may spread apart, FIG. 6, when an inlet member 106 is passed through opening 28 allowing conditioned fluid to pass.

Figure 7:
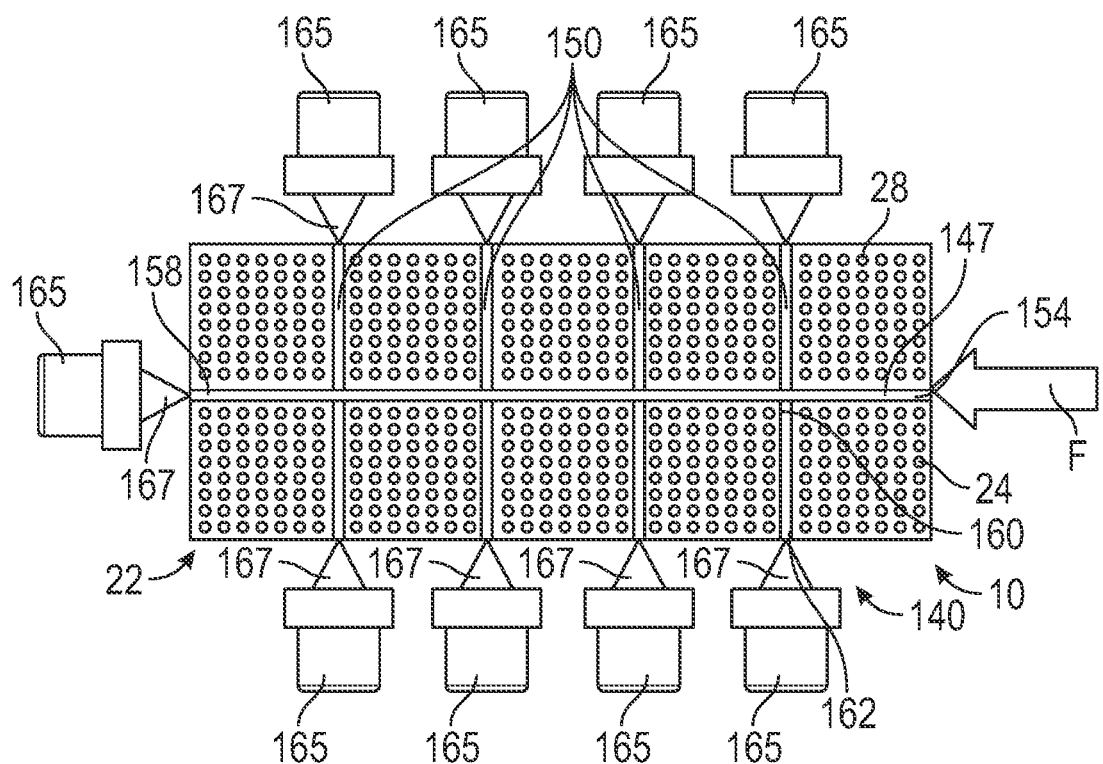
FIG. 7 is a top plan view of the vehicle including conditioned fluid supply ports arranged along passenger compartment walls, in accordance with yet another non-limiting example.
Figure 8:
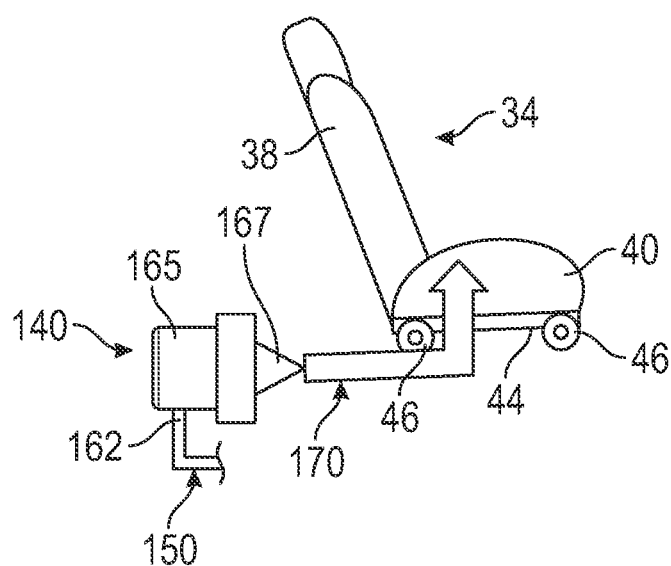
FIG. 8 is a side schematic view of a variable position seat including a thermal control system connectable to the fluid supply ports of FIG. 7, in accordance with a non-limiting example.

Reference will now follow to FIGS. 7 and 8 in describing a conditioned fluid supply system 140 in accordance with another non-limiting example. Conditioned fluid supply system 140 includes a central duct 147 and a plurality of branch ducts 150. Central duct 147 and branch ducts 150 run below first surface 24 of floor 22. Central duct 147 includes an inlet 154 and a terminal end 158. Each of the plurality of branch ducts 150 includes a first end section 160 that is fluidically connected to central duct 147 and a terminal end section 162. Terminal end 158 and each terminal end section 162 includes a conditioned fluid supply port 165. Each conditioned fluid supply port 165 includes a valve element or pivotable flap 167 and is provided in wall 30.

In a non-limiting example, seat 34 includes a nozzle 170 that mounted to support member 44 and extends rearwardly. With this arrangement, seat 34 may be moved about floor 22 to a desired position along wall 30. When in the desired position, seat 34 may be pushed toward wall 30 such that nozzle 170 passes into conditioned fluid supply port 165 opening valve element 167. Seat 34 is thus fluidically connected to conditioned fluid supply system 140. At this point, anchor system 50 may be activated to lock seat 34 to floor 22.

At this point, it should be appreciated that the non-limiting examples presented herein describe a variable position vehicle seat, e.g., a seat that may be positioned nearly anywhere on a vehicle floor. When at a selected position, the seat may be anchored to the floor and connected to a conditioned fluid supply system. The connection to the fluid supply system may occur at the same time the seat is anchored to the floor or prior to anchoring. The seat may be released and moved about the passenger compartment to the selected position without the need for specialized tools, trained technicians, or the like.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle system comprising:
    a floor having a first side and a second side that is opposite the first side, the floor including a plurality of openings;
    a seat moveably supported on the floor, the seat including a frame having a support member;
    an anchor system mounted to the support member, the anchor system including a selectively deployable anchor that secures the seat to the floor through one of the plurality of openings; and
    a thermal control system disposed in the seat, the thermal control system including a duct having an inlet and an outlet, the inlet being selectively connectable to a vehicle based fluid supply system.

2. The vehicle system according to claim 1, further comprising a supply of conditioned fluid flowing across the second side of the floor, the supply of conditioned fluid passing through select ones of the plurality of openings into the inlet.

3. The vehicle system according to claim 2, wherein the seat includes a seat back and a seat base, the duct including a first duct including a first inlet arranged at the support member and a first outlet arranged in the seat back, and a second duct including a second inlet arranged at the support member and a second outlet arranged in the seat base.

4. The vehicle system according to claim 2, further comprising a valve element arranged in each of the plurality of openings, the valve element being selectively opened when connected to the inlet.

5. The vehicle system according to claim 4, wherein the valve element includes a flexible nozzle portion including a first section and a second section, the flexible nozzle portion being selectively expanded by the inlet.

6. The vehicle system according to claim 4, further comprising a conditioned fluid manifold connected to the inlet, the conditioned fluid manifold including a plurality of inlet members that selectively pass through select ones of the plurality of openings.

7. The vehicle system according to claim 1, wherein the anchor system includes a solenoid including the selectively deployable anchor, the solenoid being energized to extend the selectively deployable anchor through the one of the plurality of openings.

8. The vehicle system according to claim 7, wherein the selectively deployable anchor includes a selectively deployable locking portion that selectively prevents withdrawal of the selectively deployable anchor from the one of the plurality of openings.

9. The vehicle system according to claim 1, wherein the inlet projects rearwardly of the seat, the inlet being selectively connectable to a wall mounted conditioned fluid supply port.

10. The vehicle system according to claim 1, further comprising a plurality of wheels connected to the frame.

11. A vehicle comprising:
a body defining a passenger compartment having a floor including a first side and a second side that is opposite the first side, and a plurality of openings formed in the floor;
a seat moveably supported on the first side of the floor, the seat including a frame having a support member;
an anchor system mounted to the support member, the anchor system including a selectively deployable anchor that secures the seat to the floor through one of the plurality of openings; and
a thermal control system disposed in the seat, the thermal control system including a duct having an inlet and an outlet, the inlet being selectively connectable to a vehicle based fluid supply system.

12. The vehicle according to claim 11, further comprising a supply of conditioned fluid flowing across the second side of the floor, the supply of conditioned fluid passing through select ones of the plurality of openings into the inlet.

13. The vehicle according to claim 12, wherein the seat includes a seat back and a seat base, the duct including a first duct including a first inlet arranged at the support member and a first outlet arranged in the seat back, and a second duct including a second inlet arranged at the support member and a second outlet arranged in the seat base.

14. The vehicle according to claim 12, further comprising a valve element arranged in each of the plurality of openings, the valve element being selectively opened when connected to the inlet.

15. The vehicle according to claim 14, wherein the valve element includes a flexible nozzle portion including a first section and a second section, the flexible nozzle portion being selectively expanded by the inlet.

16. The vehicle according to claim 14, further comprising a conditioned fluid manifold connected to the inlet, the conditioned fluid manifold including a plurality of inlet members that selectively pass through select ones of the plurality of openings.

17. The vehicle according to claim 11, wherein the anchor system includes a solenoid including the selectively deployable anchor, the solenoid being energized to extend the selectively deployable anchor through the one of the plurality of openings.

18. The vehicle according to claim 17, wherein the selectively deployable anchor includes a selectively deployable locking portion that selectively prevents withdrawal of the selectively deployable anchor from the one of the plurality of openings.

19. The vehicle according to claim 11, wherein the passenger compartment includes a side wall including a conditioned fluid supply port, the inlet projecting rearwardly of the seat, the inlet being selectively connectable with the conditioned fluid supply port.

20. The vehicle according to claim 11, further comprising a plurality of wheels connected to the frame.

* * * * *